United States Patent
Caviles et al.

(10) Patent No.: US 6,752,313 B1
(45) Date of Patent: Jun. 22, 2004

(54) METHOD AND SYSTEM FOR ESTABLISHING A CREDIT CARD TRANSACTION PROCESSING MERCHANT ACCOUNT

(75) Inventors: Allen Caviles, Mundelein, IL (US); Kristen Gramigna, Lisle, IL (US); Nicole Mondia, Addison, IL (US); John Rante, Indian Head Park, IL (US)

(73) Assignee: Online Data Corp., Westchester, IL (US)

(*) Notice: Subject to any disclaimer, the term of this patent is extended or adjusted under 35 U.S.C. 154(b) by 94 days.

(21) Appl. No.: 09/993,977

(22) Filed: Nov. 14, 2001

Related U.S. Application Data

(60) Provisional application No. 60/248,407, filed on Nov. 14, 2000.

(51) Int. Cl.$^7$ .............................................. G06F 17/00
(52) U.S. Cl. ..................... 235/375; 235/379; 235/381; 705/44
(58) Field of Search ................................ 235/375, 381; 705/10, 26, 38, 35, 44, 2

(56) References Cited

U.S. PATENT DOCUMENTS 6,135,349 A * 10/2000 Zirkel ........................ 235/375
6,226,624 B1 * 5/2001 Watson et al. ................ 705/44

OTHER PUBLICATIONS

Woloshin et al, Paperless online merchant account approval and provisioning system and method therefor, Feb. 28, 2002, U.S. patent application Publication.*

Tsiounis et al, Method and system for making anonymous electronic payments on the world wide web, Oct. 25, 2001, U.S. patent application Publication.*

* cited by examiner

*Primary Examiner*—Michael G. Lee
*Assistant Examiner*—Kimberly Nguyen
(74) *Attorney, Agent, or Firm*—Michael Best & Friedrich LLP

(57) ABSTRACT

A method is provided allowing an application processing entity such as an independent sales organization (ISO) or an acquirer bank (ACQ) to establish an active merchant account for processing credit card transactions. According to the method, a merchant may begin processing credit card transactions over the Internet or in a conventional bricks-and-mortar setting substantially immediately upon applying for a new merchant account which may be accessed when a merchant applies for a new account or obtains identification numbers in real time. These numbers are then transmitted to the merchant. The merchant may begin processing transactions immediately upon receiving the identification numbers, however, a divert flag is set which prevents funds from being dispersed to the merchant until the merchant application completes an underwriting process.

26 Claims, 7 Drawing Sheets

Congratulations!

Your ____ Merchant Account is now active. You can begin enjoying the benefits of accepting credit cards now!

Please keep the following important information for your records:

| | |
|---|---|
| Merchant ID: | 123445 |
| Gateway ID: | 525234523 |
| Login Serial Number: | 345345 |
| Merchant Support Line: | 888.780.2777 |
| Call Center: | 800.990.2265 |

You must sign and fax a printed copy of your Merchant Services Application along with a copy of a voided check to our Application Department at 888.232.1766 immediately.

As soon as we receive your signed Merchant Services Application, we can forward your transaction dollars into your business checking account.

Your application has been forwarded to our Underwriting Department for final review. In the event any additional information is needed, you will be contacted before funds are ACH'd into your checking account.

Should you have any questions, or if you received this message in error, please e-mail us at ____ or call us at ____

FIG. 7

METHOD AND SYSTEM FOR ESTABLISHING A CREDIT CARD TRANSACTION PROCESSING MERCHANT ACCOUNT

This application claims priority benefit of U.S. Provisional Application Serial No. 60/248,407 filed on Nov. 14, 2000, which is incorporated herein by reference in its entirety.

BACKGROUND OF THE INVENTION

The present invention relates to a method and system for rapidly establishing credit card merchant accounts (MAs) whereby merchants can begin processing credit card transactions or exchanging other data pertinent to such transactions nearly instantaneously after applying for a merchant account. Once the MAs are established, credit card transactions may be processed in any sales environment, including sales over the Internet and sales at conventional bricks-and-mortar establishments.

Electronic commerce over global computer networks such as the Internet is expanding rapidly. It has been estimated that worldwide Internet commerce will reach $1.44 trillion by the year 2003. The number of so-called ".com" businesses which sell their wares over the Internet is exploding. In fact, software has been developed that allows a start-up e-commerce merchant to establish an Internet presence, display products and prices and generally conduct business over the Internet in less than an hour. Also, Internet merchant host services have been established which provide the infrastructure for supporting on-line businesses so that the e-commerce merchant need not even supply the computer hardware and server software for establishing an electronic storefront.

One impediment to quickly establishing an on-line business presence is establishing a method of receiving payment for the goods or services being offered for sale over the Internet. Because the parties to Internet transactions are remote from one another, tendering cash or offering checks and other traditional forms of payment is generally impractical. Credit card transactions therefore have become the de facto standard method of tendering payment over the Internet. But, before an on-line merchant can begin accepting credit card payments, the merchant must first establish a credit card merchant account (MA). Of course, the same applies to merchants operating out of conventional bricks-and-mortar establishments.

Each MA includes a merchant identification number (MID), a terminal identification number (TID), and a gateway identification number (GID). The MID uniquely identifies the merchant, and the TID uniquely identifies the merchant location where a particular transaction occurs. In general, a merchant will have but a single MID, but may have multiple TIDs if the merchant is doing business from multiple locations, including any combination of different Internet addresses and bricks-and-mortar sites. Merchants doing business exclusively over the Internet or exclusively at a single bricks-and-mortar location, however, will likely have but a single TID. The GID identifies an Internet gateway between the public Internet and a private network of banks, independent sales organizations (ISOs), acquirer banks (ACQs) and processing centers for processing credit card transactions.

Using traditional methods, applying for and establishing an MA can take from a few days to several weeks. This is a significant burden to the start-up on-line merchant. During the period when the merchant is waiting for the MA the merchant is effectively prevented from conducting business, possibly losing revenue that may be necessary for the business to survive and grow. Thus, there is an acute need for a method of establishing credit card processing MAs for on-line merchants. By the same token, conventional bricks-and-mortar merchants will also benefit from an expedited method for establishing credit card MAs. The present invention provides such a method, as well as a system for implementing the inventive method.

Before describing the method and system of the present invention, however, it is first necessary to describe the on-line credit card transaction process and the elements necessary to establish an MA. FIG. 1 shows a schematic diagram of a typical set-up for processing credit card transactions over the Internet. An on-line merchant is shown at 12. Merchant 12 may be independently operating its own web server, supporting its web presence with its own hardware and software, or the merchant may be setting up its online business through a merchant host server 14. (Since the merchant host server 14 is optional, it is shown in dashed lines in the figure.) The Internet is shown as an amorphous cloud 22 of interconnected networks and packet switched routers and computers, all implementing standard Internet protocols as is known in the art.

Also shown connected to the Internet 22 are an on-line customer 18, an independent sales organization (ISO) 20 or, alternatively, acquirer bank (ACQ) 21 and a payment gateway 16. The payment gateway 16 is in turn connected to a credit card processing front-end system or authorization center 24 which is connected to a back-end settlement network 26. The merchant's acquiring bank 28 (which may be different from ACQ 21 but often will be the same entity), a credit card issuing bank 30, and the ISO 20 are connected through the back-end settlement network 26.

During the course of an Internet transaction, a payment page is sent from the merchant 12 to the on-line customer 18 and displayed by the customer's Internet browser. The customer enters his or her credit card number, the expiration date of the card, and the purchase amount in the designated fields of the payment page and selects a transmit function typically activated by mouse clicking on a software button displayed on the payment page. The MID, TID and GID associated with the merchant's MA are embedded within the instructions for displaying the payment page.

The browser transmit function sends the transaction data, preferably through a secure socket layer (SSL), including the credit card number, expiration date, the MID and the TID, to an Internet gateway 16 designated by the GID embedded within the payment page. The gateway directs the transaction to front-end processing center 24, also identified by the GID. The front-end processing center verifies that the card has not been reported lost or stolen, that the transaction is within the customer's credit limit, and may perform other security checks. Typically, this is accomplished by contacting a transaction authorization agent associated with the brand of the credit card, for example, VISA, Mastercard, American Express, Discover, and the like. Provided that all of the data and security checks pass muster, the transaction is approved. A message, usually including an approval code, is sent back to the merchant through the payment gateway 16 and over the Internet 22. At this point the transaction is considered to be authorized (or "captured").

Once the transaction data reaches the front-end system 24, the transaction proceeds in the conventional manner. The front-end processing center accumulates transactions throughout each business day. At the end of each day the front-end processing center batches the captured transactions to the various acquiring banks associated with the merchants whose transaction have been accumulated. The proper acquiring bank for a particular transaction may be identified from the MID and TID associated with the transaction.

Once the acquiring bank receives the batched transactions, the bank performs an automated clearinghouse function on the transactions (ACH). As part of the ACH, the acquiring bank batches transaction files to each of the card issuing banks whose credit card holders have entered transactions captured by the front-end processing center and forwarded to the acquiring bank. The issuing banks post the transactions to their cardholders' accounts to be listed on the cardholders' monthly statements. The issuing bank then transfers funds covering the transactions to the acquiring bank. The ACH function further sends transaction files to the ISOs or ACQs responsible for establishing the MAs with the merchants whose transactions are being cleared. The ISOs and ACQs maintain risk management files which include underwriting and transaction approval guidelines. If various transactions do not meet the transaction approval guidelines, the ISO or ACQ withholds settlement of the transactions and prevents funds from being dispersed by the acquiring bank to the merchant unless or until a satisfactory determination that the transactions are legitimate has been made. If, however, the transactions do not run afoul of the transaction approval guidelines, the funds transfer is approved, and the acquiring bank transfers the funds to the merchant. Dispersing the finds to the merchant completes the settlement process.

As can be seen from the above description, a large amount of data must pass between a number of different entities or sites during the course of the credit card transaction. Furthermore, there are large numbers of merchants processing transactions using different shopping cart software, vendor payment gateways, front-end processing centers, back-end settlement networks, acquiring banks, issuing banks and ISOs or ACQs. All of these components and organizations must be properly identified and properly set up to identify and process transactions for each particular merchant such as merchant 12. Setting up the merchant with proper identification codes, and updating the payment gateway 16, the front-end systems 24, the back-end systems 26, the acquiring bank 28, and the ISO 20 or ACQ 21 with information identifying the merchant associated with the identification codes defined by a newly-created MA all take place when the MA is established. Identifying and assembling available active MID, TID and GID into a single account and updating the various systems with the new MID, TID, and GID assigned to a new MA is a primary reason for the delay in establishing new MAs. Another cause for delay in establishing new MAs is the hiatus in the rest of the application process during the underwriting step wherein the merchant's bona fides are established and confirmed.

SUMMARY OF THE INVENTION

The present invention relates to a method for quickly and efficiently establishing merchant accounts (MAs) which allow on-line and conventionally operated companies to accept credit cards as payment over a computer network. For purposes of the present application the invention will be described as being carried out over the global computer network commonly referred to as the Internet. However, it should be noted that the present invention is not limited to embodiments carried out over the Internet; other computer networks, or combinations of networks, may alternatively be employed. The method of the present invention allows a merchant to begin processing transactions substantially immediately upon submitting an on-line merchant account application. The present invention may be carried out using software code readily written by those skilled in the art to implement the various functions described herein.

According to a preferred embodiment of the invention, an application processing entity, such as an independent sales organization (ISO) or an acquirer bank (ACQ), is responsible for establishing merchant accounts, including assigning to the merchant merchant identification numbers (MIDs), terminal identification numbers (TIDs) and gateway identification numbers (GIDs) to enable the merchant to process credit card transactions. This first processing entity (ISO or ACQ) is also responsible for updating the various systems involved in processing transactions and settling accounts for transactions subsequently entered by the merchant.

According to a preferred method of the present invention, the application processing entity maintains a database of active available MIDs, TIDs and GIDs. Upon receiving an indication from a merchant that the merchant desires to establish a new merchant account, the application processing entity transmits a merchant account application to the merchant. The merchant then completes the form, preferably on-line, and transmits the data requested on the form to the application processing entity. The application process is preferably controlled by a merchant account application network server operated by the application processing entity, and the resultant exchange of forms and data preferably takes place over the Internet.

Once the application processing entity receives the merchant's completed application form, the application processing entity creates a new merchant account uniquely associated with the merchant. The new merchant account is populated by a series of shell accounts associating particular MIDs, TIDs and GIDs selected from a pool of available active MIDs, TIDs and GIDs stored in the application processing entity's database. The MID, TID and GID assigned to the new merchant account (MA) are then sent to the merchant who can immediately use the MID, TID and GID assigned to it to process credit card transactions. The various credit card transaction processing systems over the Internet are also updated with the new MID, TID and GID assigned to the new MA.

In an alternative embodiment of the invention (which may use API or XML), an individual MID, TID and GID would not be assigned to a single account prior to the assignment of these identification numbers to a particular merchant and the activation of the account. Rather, the MID, TID and GID would be assigned in real time or "on the fly" by pulling these identification numbers from another server such as a vendor or a private vendor gateway when the merchant submits an indication that it wishes to establish a new MA.

Further, according to the inventive method of the present invention, upon creating the new merchant account, the application processing entity may set a divert flag in its own back-end systems. The divert flag acts to prevent the transfer of finds from an acquiring bank associated with the newly-created merchant account (MA) to the merchant in settlement of transactions processed by the merchant. The divert flag will remain set until the merchant's application completes the underwriting process in which the ISO determines whether the merchant represents an acceptable risk according to predefined conventional risk criteria. Since the merchant's MID, TID and GID are active, the merchant can process credit card transactions immediately, even though the merchant's application has not completed the underwriting process. However, the funds associated with the credit card transactions processed by the merchant will not be dispersed to the merchant while the divert flag is set.

When the application successfully completes the underwriting process, the divert flag may be reset and funds allowed to flow to the merchant to cover the diverted transactions. In this way, the merchant may begin accepting credit cards substantially immediately upon opening the merchant account, even while the underwriting process is taking place. At the same time, the application processing entity and the acquiring bank associated with the account are protected against releasing funds to a possibly unscrupulous or fraudulent applicant until the merchant has passed the underwriting process.

The method of the present invention further includes provisions for displaying a banner advertisement on the web site of a third party such as an application service provider providing web hosting services. Such a banner advertisement may include a hypertext link to a web site operated by the application processing entity (ISO or ACQ). Thus, a merchant viewing the web site of the third party may access the application processing entity's web site by mouse clicking the banner advertisement and executing the hypertext link to the web site. The hypertext link associated with the banner advertisement may include embedded or encoded data which identifies the party hosting the banner advertisement, so that the application processing entity may record how a merchant applicant was directed to the application processing entity's site. The application processing entity may then establish residual tables so that the party who directed the merchant to the application processing entity may share in the profits from servicing the merchant's account.

BRIEF DESCRIPTION OF THE DRAWINGS

FIG. 7 is a sample congratulation page wherein the MID, TID and GID of a new MA are transmitted to a new on-line MA applicant.

DETAILED DESCRIPTION OF THE INVENTION

The present invention provides an improved method which speeds up the process in which a merchant obtains an activated MA for processing credit card transactions. The method is carried out by an application processing entity such as an independent sales organization (ISO) or an acquirer bank (ACQ) responsible for establishing merchant accounts (MAs) and thereby establishing the relationship between merchants and an acquiring bank as described in the background section. Once this relationship has been established, the acquiring bank clears the merchant's transactions and disperses finds to the merchant to cover the credit card transactions entered by the merchant. The application processing entity acts as an agent of the acquiring bank and typically will receive a fee from the acquiring bank based on a percentage of the value of the transactions processed by each merchant for which the application processing entity has established an MA.

Figure 2:
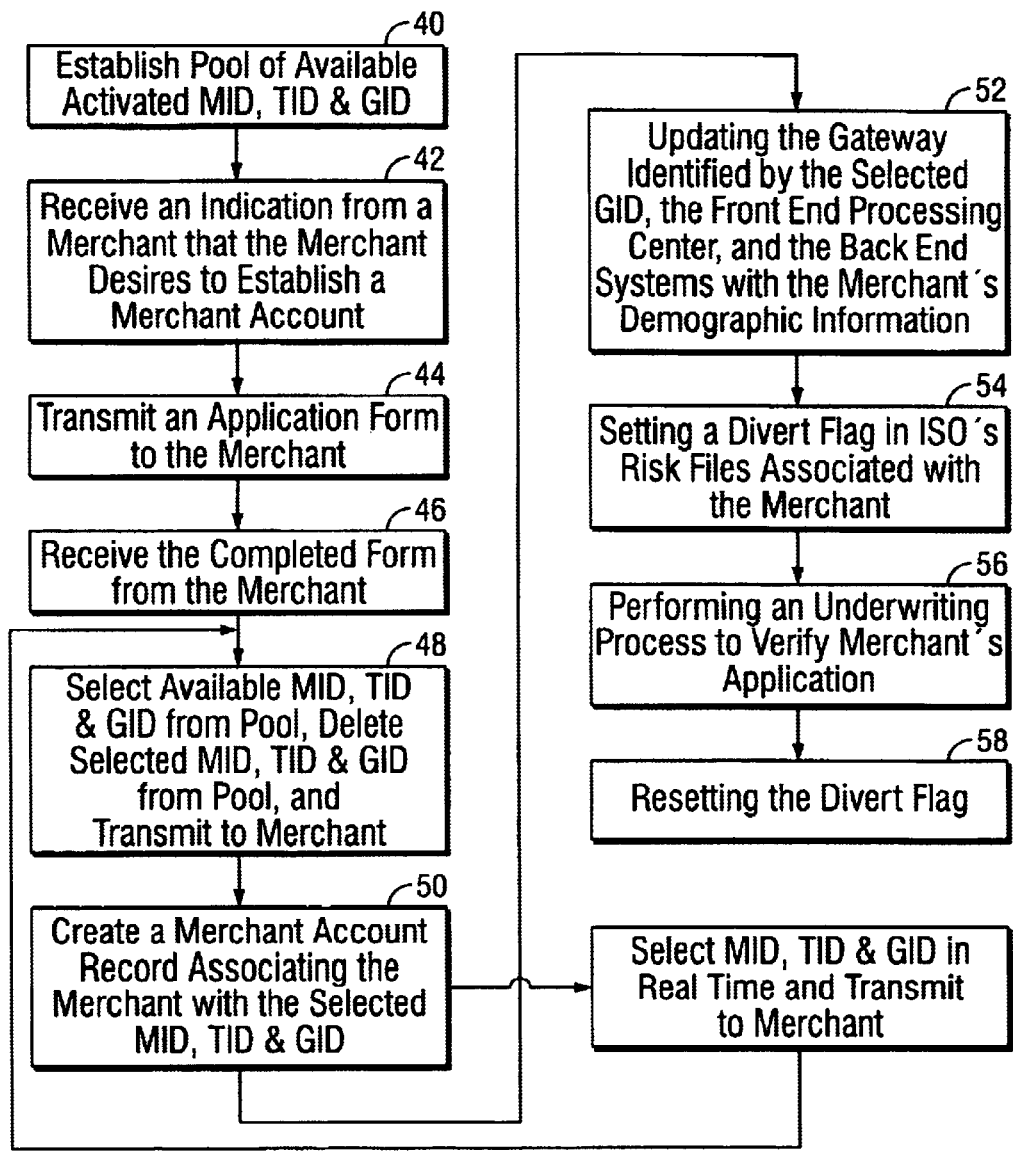
FIG. 2 is a flowchart showing the method of the present invention.

The method according to the present invention is set forth in the flowchart in FIG. 2. In this example, the application processing entity is an ISO. The method begins at step 40 where the ISO maintains a pool of MA identification numbers (MIDs), terminal identification numbers (TIDs), and gateway identification numbers (GIDs) that have been activated but not assigned to MAs. The ISO may organize the pool of available MIDs, TIDs and GIDs as a series of shell accounts wherein an individual MID, TID and GID is assigned to a single account prior to the account being assigned to a particular merchant and activated. Since the MID, TID and GID are all active ID numbers, they are immediately available for processing credit card transactions as soon as the shell account is assigned to a merchant. Next, step 42 of the inventive method involves receiving an indication from a merchant that the merchant wishes to establish a new MA. Such an indication may be registered in a number of different ways, including contacting the ISO's Internet web page.

Upon receiving an indication that a merchant wishes to apply for a new MA, the ISO transmits an MA application to the merchant at step 44. Typically this will be accomplished by downloading the application from the ISO's web server to the merchant over the Internet. Once the merchant has received the MA application form, the merchant completes the form and sends it back to the ISO. Again, this transaction preferably will occur by way of the Internet. The ISO receives the completed application at step 46. At step 48 the ISO selects a shell account containing an available MID, TID and GID from the pool of available active MIDs, TIDs and GIDs and transmits the MID, TID and GID contained in the shell account to the merchant.

In an alternative embodiment of the invention (which may use API or XML), an individual MID, TID and GID would not be assigned to a single account prior to the assignment of these identification numbers to a particular merchant and the activation of the account. Rather, the MID, TID and GID would be assigned in real time or "on the fly" by pulling these identification numbers from another server such as a vendor or a private vendor gateway when the merchant submits an indication that it wishes to establish a new MA. Now, at step 50 the ISO creates a record associating the merchant applicant with the selected MID, TID and GID, and establishing an active MA.

Because the selected MID, TID and GID were either chosen from a pool of shell accounts made up of active MIDs, TIDs and GIDs or, in the alternative, chosen on the fly from available MIDs, TIDs and GIDs, the merchant may begin processing credit card transactions substantially immediately upon receiving the MID, TID and GID now associated with its MA. When the application completes the underwriting process, the appropriate funds will flow to the merchant, as explained below.

Upon establishing the new MA, the ISO system updates the other elements of the credit card processing system at step 52. This includes updating the front-end processing center, the Internet gateway identified in the GID, and the back-end systems including the acquiring bank's systems and issuing bank's systems with information regarding the identity of the merchant associated with the MA, and other demographic information relating to the merchant.

When the merchant's new MA account is initially set up, the ISO's internal systems set a divert flag in the ISO's risk files as indicated in step 54. The ISO's risk files are established to monitor transactions to identify suspicious and possibly fraudulent activity. If individual transactions, or transactions involving a particular merchant do not meet the ISO's risk guidelines, the ISO may withhold approval for transferring funds from the acquiring bank to the merchant. Further, according to the present invention, the ISO will withhold approval for the dispersal of funds to a merchant if the divert flag is set in the merchant's MA indicating that the merchant's account has not cleared the underwriting process. The diverted transactions are accumulated for later processing and the dispersal of funds to the merchant once the divert flag has been reset.

At step 56 the ISO undertakes an underwriting process wherein the information provided by the merchant in the on-line application form is reviewed. The ISO has predefined rules which determine whether or not a given merchant represents an acceptable risk for doing business with. This underwriting process may proceed in a conventional manner with human control and intervention. Alternatively, it may be automatically implemented by electronically submitting the pertinent data to a computer which is programmed to compare the data to predetermined standards and criteria and to render a creditworthiness decision.

If, upon completion of the underwriting process, the merchant appears to be a legitimate business and the merchant's risk factors are acceptable, the ISO resets the divert flag at step 58, thereby allowing funds to flow from the acquiring bank to the merchant to cover the transactions entered by the merchant just as in traditional settlement transactions. This process protects the ISO and acquiring bank from dispersing funds to unscrupulous applicants, while allowing merchants to begin processing credit card transactions immediately upon receiving the MA. Legitimate merchants will receive their funds generated from credit card transactions once the underwriting of their application is completed.

A system for implementing a preferred embodiment of the invention will now be described with reference to FIGS. 1, 2, 4, and 5. The overall set up of a system for carrying out the preferred embodiment of the inventive method of the present application is substantially the same as that shown in FIG. 1 and described in the background section. A merchant web server 12, a merchant host web server 14, an ISO web server 20, and a payment gateway 16 are all connected to the Internet 22. The payment gateway 16 is connected via a private network to a front-end processing center 24, which in turn is connected to a back-end settlement network 26. The internal systems of the ISO, the acquiring bank, and the issuing bank are all interconnected via the back-end settlement network 26.

It is contemplated that a merchant desiring to establish an MA may approach the ISO either directly or through a merchant host web server 14. A merchant may contact the ISO directly by accessing the ISO's web page directly over the Internet. If, on the other hand, the merchant is establishing its web presence through the services of a merchant host, the merchant may be directed to the ISO's web page by clicking on a banner advertisement displayed on the merchant host's web page.

It is expected that a plurality of merchant hosts will display the advertising banner for the ISO's services. Each merchant host web server will be provided with software for displaying the ISO's advertising banner on its web page. As a merchant steps through the process of establishing an Internet storefront (or a bricks-and-mortar establishment) employing the merchant host's facilities, there may be a step in which the merchant is required to either supply information regarding its preexisting MA or establish a new one. At this juncture the ISO's banner advertisement may be displayed indicating that the MA may be applied for on-line. The banner advertisement appearing on the merchant host's web page will include a hypertext link which is executed by the merchant's web browser, causing the browser to contact the ISO's web server. The link further includes information such as an associate and representative code which allows the ISO to determine the merchant host from which the merchant contact originated. If the merchant clicks on the banner advertisement, the merchants web browser contacts the ISO's web server and the ISO's web server downloads the ISO's web page to the merchant's web browser.

Whether the merchant contacts the ISO directly or through a banner advertisement on a merchant host web site, the end result is that the ISO's MA application web page is downloaded to and displayed on the merchant's web browser. The merchant may then indicate that it wishes to establish a new MA by selecting the appropriate menu options on the ISO's MA application web page. Upon receiving such an indication, the ISO's MA application form is downloaded to the merchant's web browser for display.

Figure 1:
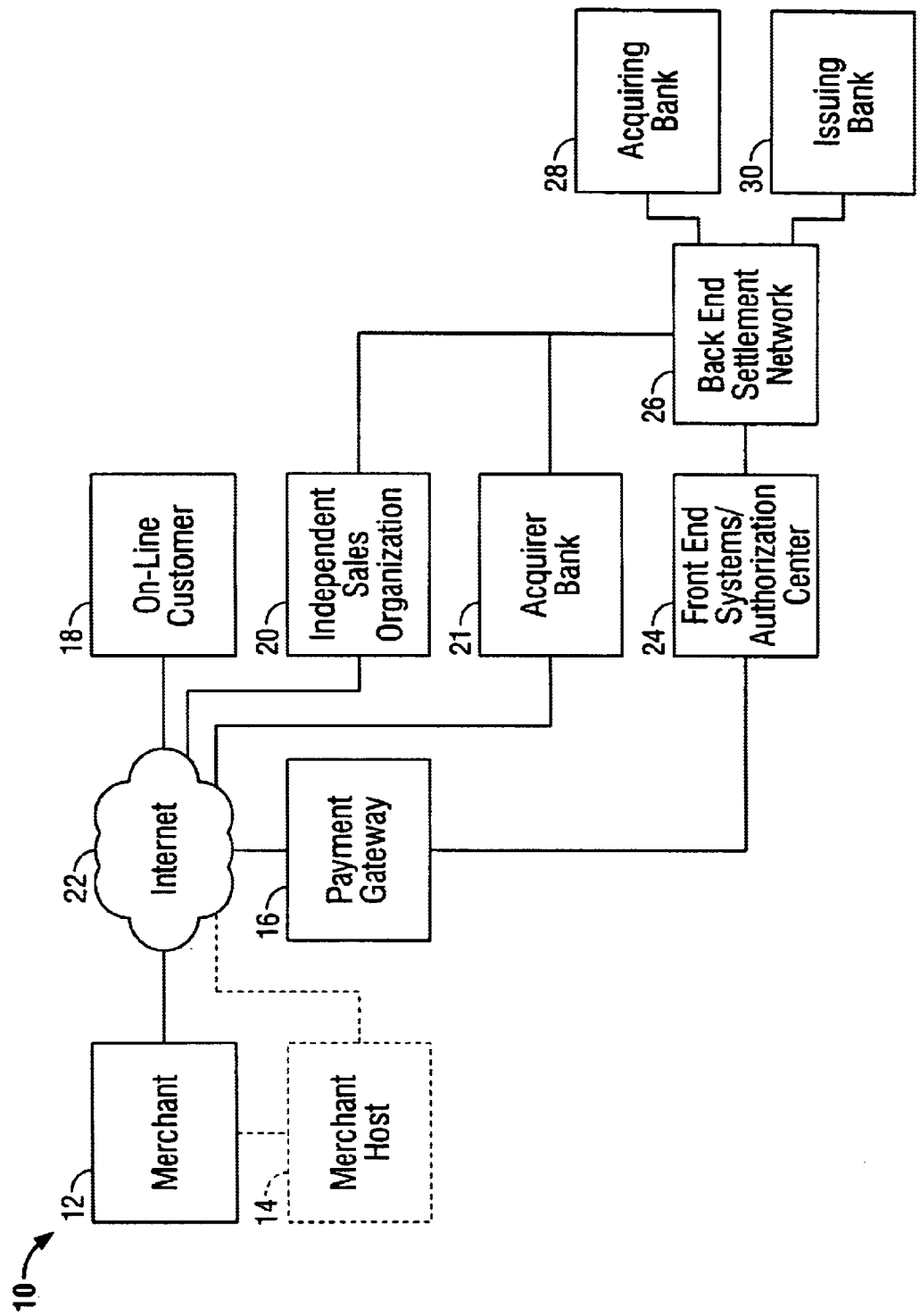
FIG. 1 is a block diagram of a system for processing credit card transactions over the Internet.
Figure 3:
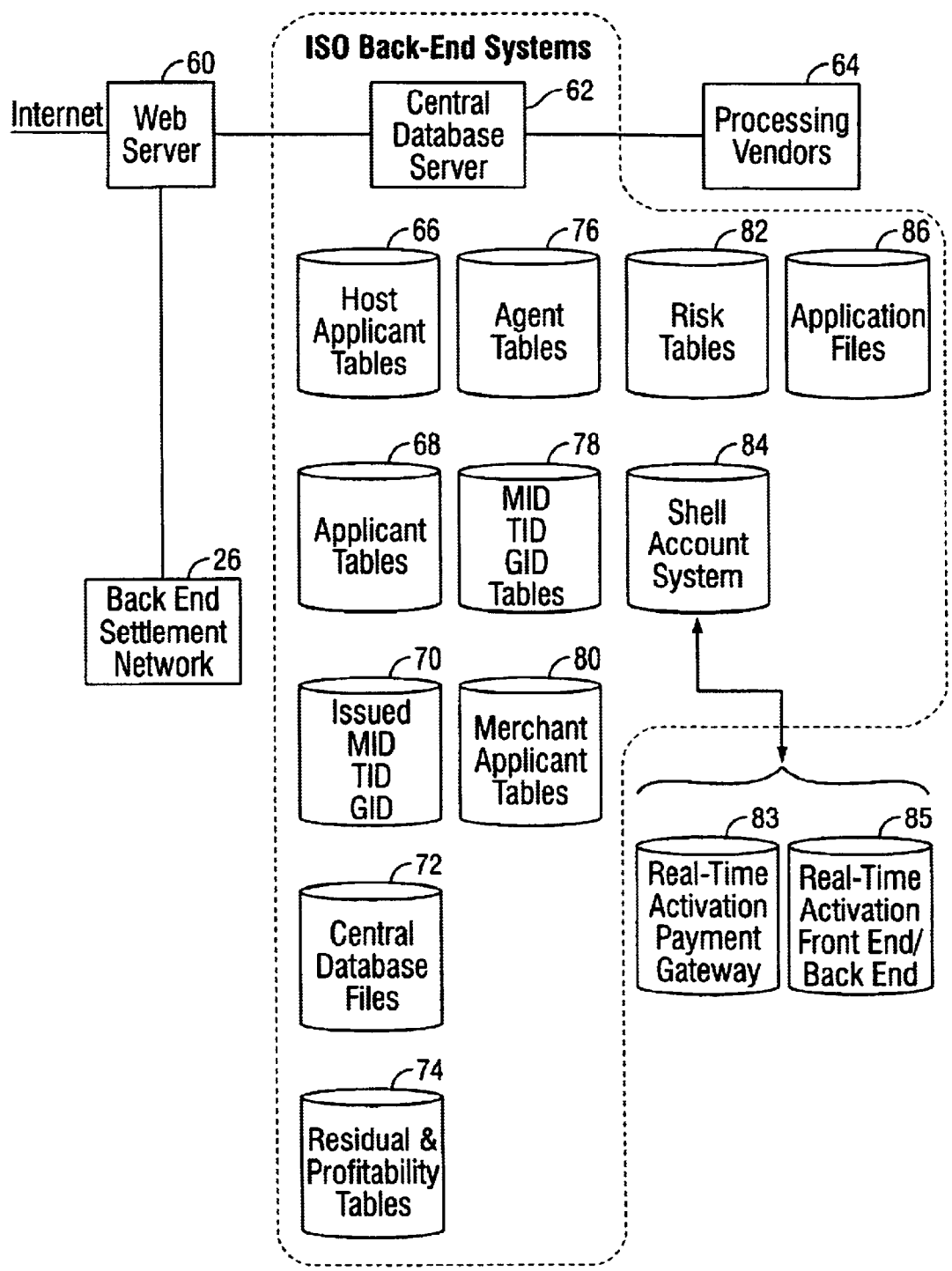
FIG. 3 is a block diagram of the ISO's back-end systems for implementing the method of the present invention.

In addition to the basic components shown in FIG. 1, the ISO operates additional "back-end systems" as shown in FIG. 3. The ISO's systems include a web server 60 connected to the Internet and to the back-end settlement network 26, and a central database server 62 connected to various processing vendors 64. The central database server includes host application tables 66; applicant tables 68; issued MID, TID, and GID tables; central database files 72; residual and profitability tables 74; agent tables 76; available MID, TID and GID tables 78; merchant tables 80; risk tables 82; shell account systems 84; and application files 86. In the alternative real-time approach to assigning MIDs, TIDs and GIDs, shell account system 84 would be replaced by real-time gateway 83 and real-time activation front end/back end 85.

Figure 4:
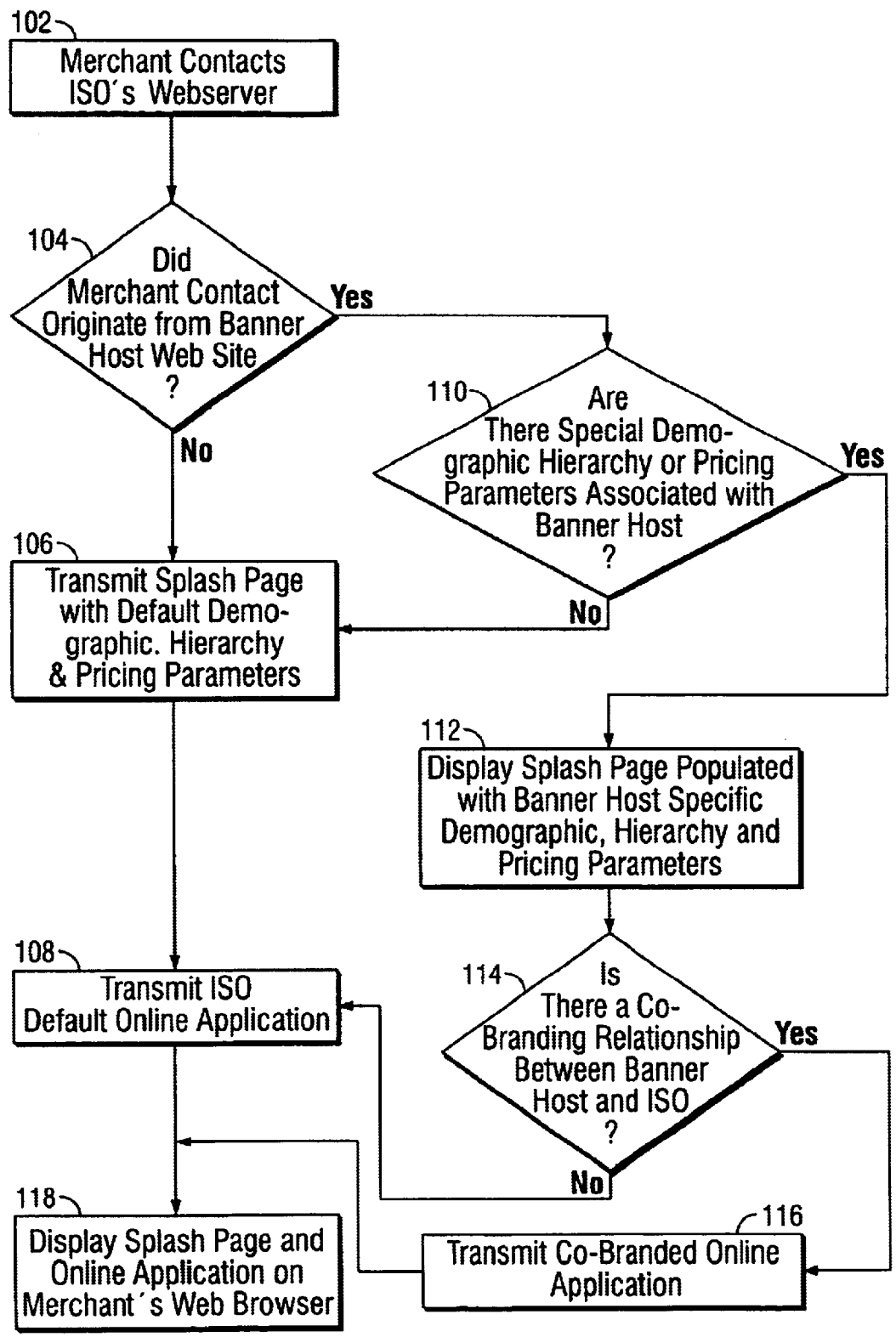
FIG. 4 is a flowchart showing the generation of an MA application employing the ISO's back-end systems depicted in FIG. 3.

A flowchart for displaying a merchant application on a merchant's Internet web browser is shown in FIG. 4. At step 102, the merchant contacts the ISO's web server. At step 104 the ISO's web server determines whether the merchant contact originated from a merchant host displaying the ISO's advertising banner, or whether the merchant contacted the ISO's web site directly. This determination may be made by examining the link executed by the merchant's web browser in contacting the ISO's web server.

If the merchant contacted the ISO's web server directly, the process moves to step 106 wherein a "splash page" providing a step-by-step navigational site map or a full window containing instructions for completing the application is transmitted from the ISO's web server to the merchant for display by the merchant's web browser. The splash page provides information about the MA, pricing for services, and instructions for obtaining an MA. Because there is no third party involved, the splash page is populated by a default demographic, hierarchy, and default pricing parameters. Following step 106, the ISO's web server transmits a default on-line application to the merchant over the Internet for display by the merchant's Internet browser as indicated in step 108.

Returning to step 104, if the merchant contact originated from a banner advertisement displayed by a merchant host, the system must then determine whether there are any special demographic, hierarchy, or pricing parameters associated with the particular merchant host from which the contact arose, as indicated at step 110. If no special parameters have been established between the ISO and the merchant host, then the default splash page populated by the default demographic, hierarchy and pricing parameters is transmitted to the merchant for display by the merchant's Internet browser in step 106. Otherwise, if special arrangements have been made between the merchant host and the ISO, a unique splash page is transmitted to the merchant, as indicated at step 112. This unique splash page will be populated by merchant host specific demographic, hierarchy, and pricing parameters retrieved from the host tables 66 which are accessed through the ISO's central database server 62.

Figure 6:
FIG. 6 is a sample on-line MA application form.

Next, at step 114 a determination is made as to whether there is a co-branding relationship between the merchant host and the ISO. Again, this can be determined by accessing the host application tables 66 via the ISO's central database server 62. If there is no co-branding relationship between the merchant host and the ISO, then the standard default on-line application is downloaded to the merchant at step 108. An example of a default merchant account application is shown in FIG. 6. If there is a co-branding relationship between the merchant host and the ISO, a merchant host specific co-branded online application (not shown) is sent to the merchant at step 116. Both the on-line application and the splash page are displayed by the merchant's web browser at step 118.

Figure 5:
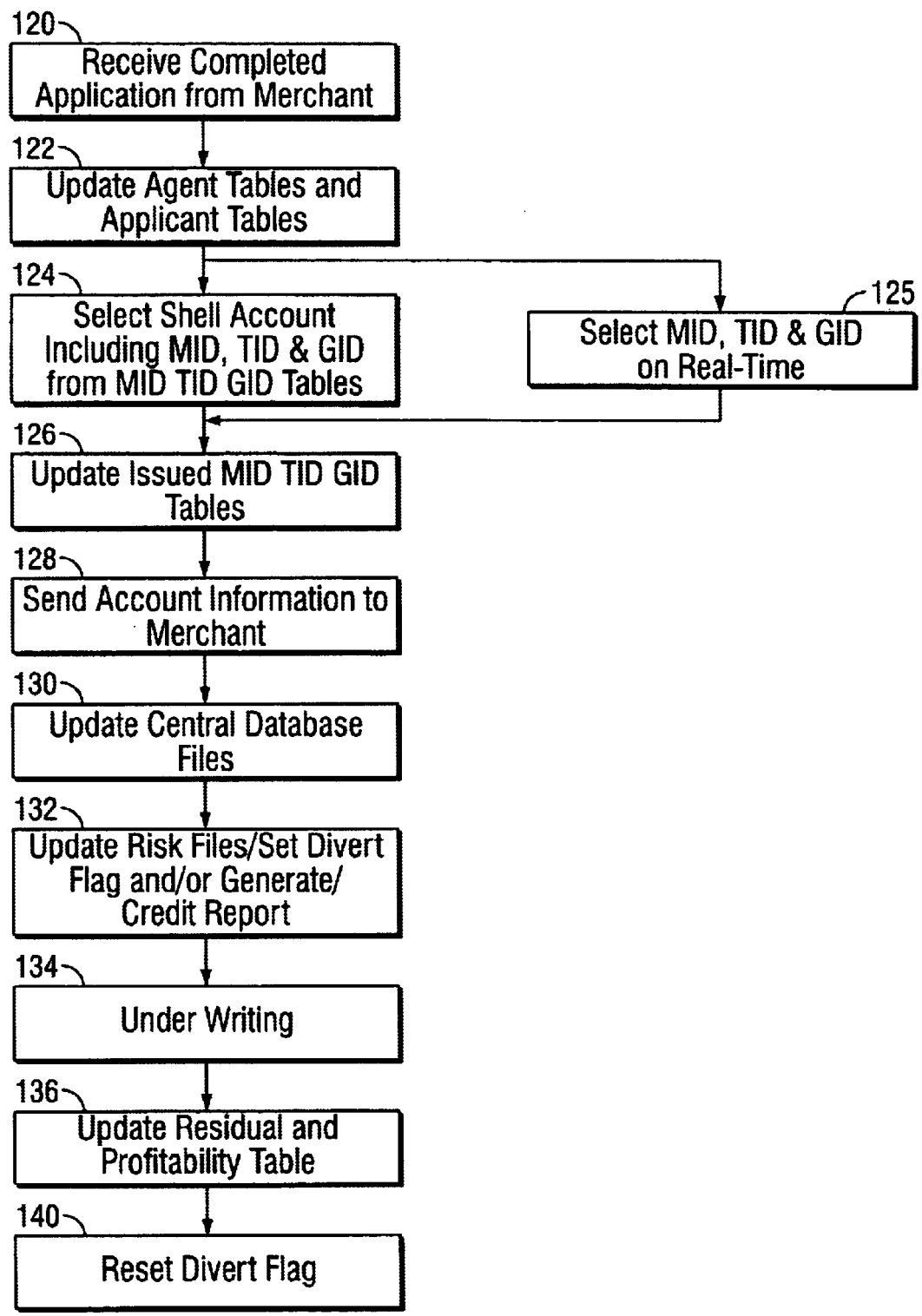
FIG. 5 is a flowchart of the steps required to establish the MA employing the ISO's back-end systems depicted in FIG. 3.

Turning now to FIG. 5, a flowchart showing the process of establishing a new MA is shown. Once the on-line application has been sent to the merchant, the merchant completes the form by typing in the information required by the various fields contained on the form and transmits it back to the ISO's web server 102. The ISO's web server 102 receives the completed application at step 120. At step 122 the ISO's central database server retrieves data identifying the merchant host, if any, from the agent tables 76 and posts the data to the applicant tables 68. Henceforth, the MA established for the merchant will be associated with the merchant host who directed the merchant to the ISO.

At step 124 the ISO's central database server selects a shell account including an available MID, TID and GID from the MID, TID and GID tables 78. The MID TID and GID associated with the shell account are written to the issued MID, TID and GID tables 70 at step 126. This step includes creating and storing a record of the newly created MA including the MID, TID and GID and the merchant data obtained from the completed on-line MA application form. Substantially simultaneously, the MID, TID and GID may be sent to the merchant via the ISO's web server 60 over the Internet, as shown in step 130. Or, in the real-time alternative embodiment discussed above, no shell account is established, but rather the MID, TID and GID are assigned on the fly as at step 125.

FIG. 7 shows a congratulatory page which may be transmitted to the merchant to be displayed by the merchant's web browser. The congratulatory page includes the merchant's MID, TID and GID. Also, a confirmation (not shown) may be sent to a separate e-mail account provided by the merchant during the application process.

The ISO's central database files are updated at step 130. The ISO's risk management is updated at step 132 by re-examining risk data and/or by generating a credit report. For newly created MAs this involves setting a divert flag which will prevent funds from being disbursed from the acquiring bank associated with the MA to the merchant until the merchant's application has completed the ISO's underwriting process. At step 134 the ISO's residual and profitability tables are updated. These allow the ISO to monitor the transactions processed by the merchant, and to track the profits which must be allocated to the merchant host who originally directed the merchant to the ISO.

From the foregoing, it will be observed that numerous variations and modifications may be effected without departing from the spirit and scope of the invention. It is to be understood that no limitation with respect to the specific methods illustrated herein is intended or should be inferred. It is, of course, intended to cover by the appended claims all such modifications as fall within the scope of the claims.

What is claimed is:

1. A method enabling a merchant to establish a merchant account for processing credit-card transactions whereby the merchant may begin processing transactions upon submitting an on-line merchant account application, the method comprising the steps of:

providing from a merchant to an application processing entity an indication that the merchant wishes to establish a merchant account;

transmitting over the Internet from the application processing entity to the merchant a merchant account application requesting data for establishing a merchant account;

transmitting over the Internet from the merchant to the application processing entity the data for establishing a merchant account;

at the application processing entity, creating an account associated with the merchant;

at the application processing entity, maintaining a database of available active merchant identification numbers (MIDs) that may be used to uniquely identify a merchant, terminal identification numbers (TIDs) that may be used to uniquely identify a particular location from which the merchant will be processing credit card transactions, and gateway identification numbers (GIDs) that uniquely identify various network gateways through which credit card transactions may be routed through a computer network to a transaction processing center;

at the application processing entity selecting and assigning a MID, TID, and GID to the merchant account from said plurality of available MIDs, TIDs and GIDs stored in said database; and at the application processing entity transmitting the selected MID, TID, and GID to the merchant.

2. The method of claim 1 in which the application processing entity is an independent sales organization (ISO).

3. The method of claim 1 in which the application processing entity is an acquirer bank (ACQ).

4. The method of claim 1 in which particular MIDs, TIDs and GIDs are associated in shell accounts and one of the shell accounts is chosen by the application processing entity and assigned to the merchant.

5. The method of claim 1 in which the MID, TID and GID are selected on a real-time basis.

6. The method of claim 1 further comprising the step of updating the processing center to which the GID routes the merchant's transactions with demographic data supplied by the merchant in completing the merchant account application, so that transactions processed by the merchant may be properly identified.

7. The method of claim 6 further comprising the step of updating a credit card back-end settlement network with the merchant's demographic data.

8. The method of claim 1 further comprising the step of setting a divert flag to prevent the transfer of funds from an acquiring bank associated with the merchant account to the merchant in settlement of transactions processed by the merchant.

9. The method of claim 8 further comprising the step of underwriting the account to verify the data submitted by the merchant in completing the merchant account application and to determine whether the merchant represents an acceptable risk according to predefined risk criteria.

10. The method of claim 9 further comprising the step of resetting the divert flag upon successful completion of the underwriting step.

11. A method allowing an application processing entity to establish an active merchant account for processing credit card transactions whereby an online merchant may begin processing credit card transactions over the Internet upon applying for the merchant account, wherein the application processing entity performs the steps comprising:

maintaining a pool of available active merchant identification numbers (MIDs), terminal identification numbers (TIDs) and gateway identification numbers (GIDs);

sending an on-line merchant account application to a merchant desiring to establish an account so that the merchant may complete and return the application to the application processing entity on-line;

selecting a MID, TID and GID from the pool of available active MIDs, TIDs and GIDs and creating an account record associating the merchant with the selected MID, TID and GID;

removing the selected MID, TID and GID from the pool of available active MIDs, TIDs and GIDS; and transmitting the selected MID, TID and GID to the merchant.

12. The method of claim 11 further comprising the steps of displaying a banner advertisement on a third-party web site, said banner advertisement including a hypertext link to a web site operated by the application processing entity, whereby a merchant viewing the web site of the third party may access the web site of the application processing entity by executing the hypertext link associated with the banner advertisement.

13. The method of claim 12 wherein the hypertext link associated with the banner advertisement includes encoded data identifying the third party so that the application processing entity may record that a merchant executing the link was directed to the application processing entity from the third party's web site.

14. The method of claim 13 further comprising the steps of:

establishing residual tables identifying the third party as a source of a merchant account established as a result of the merchant executing the link included in the banner advertisement displayed on the third party's web site; and paying the third party a residual based on the value of credit-card transactions processed by the merchant.

15. The method of claim 12 wherein the third party is an application service provider acting as a merchant host whereby on-line merchants may establish their Internet presence employing the application service provider's facilities.

16. The method of claim 11 wherein the step of sending an on-line merchant account application to the merchant comprises transmitting an on-line application web page over the Internet.

17. The method of claim 11 wherein the step of transmitting the MID, TID and GID to the merchant comprises transmitting a congratulatory web page to the merchant over the Internet, the congratulatory web page including the selected MID, TID and GID.

18. The method of claim 11 wherein the step of transmitting the MID, TID and GID to the merchant comprises sending a message including the selected MID, TID and GID to the merchant by Internet e-mail.

19. The method of claim 11 wherein the merchant begins processing credit card transactions substantially immediately upon receiving the selected MID, TID and GID.

20. The method of claim 11 further comprising the step of setting a divert flag associated with the merchant account.

21. The method of claim 20 further comprising an underwriting step wherein the application processing entity verifies data supplied by the merchant in the completed on-line application and determines whether the merchant represents an acceptable risk based on predefined risk criteria.

22. The method of claim 21 further comprising the step of resetting the divert flag when it has been determined that the merchant represents an acceptable risk during the underwriting step.

23. The method of claim 22 further comprising the step of offering special pricing for establishing a merchant account to merchants directed to the ISO by the ASP.

24. The method of claim 22 further comprising the step of transmitting a merchant account application form to the merchant to be completed by the merchant and returned to the ISO, the application form being co-branded with the names of both the ISO and the ASP.

25. The method of claim 21 further comprising the step of establishing a relationship with an application service provider (ASP), whereby merchant customers of the ASP may be directed to an independent sales organization (ISO) for purposes of establishing the merchant account.

26. A method of establishing a merchant account whereby a merchant may begin processing credit-card transactions over a computer network upon applying for said merchant account, said computer network being interconnected with a credit card front-end processing center and a back-end settlement network via a network gateway, said merchant account comprising a merchant identification number (MID), a terminal identification number (TID), and a gateway identification number (GID), the MID uniquely identifying the merchant, the TID uniquely identifying a particular location or facility from which the merchant is processing credit-card transactions, and the GID uniquely identifying the particular network gateway through which credit card transactions originating from the merchant will be routed to the front-end processing center and the back-end settlement network, the method comprising the steps of:

maintaining a pool of available active MIDs, TIDs and GIDs;

receiving an application for a new merchant account from the merchant;

selecting a MID, TID and GID from said pool of available active MIDs, TIDs and GIDs;

removing said selected MID, TID and GID from said pool of available active MIDs, TIDs and GIDs and writing said selected MID, TID, and GID to a database for issued MIDs, TIDs, and GIDs;

transmitting the selected MID, TID and GID to the merchant;

updating the gateway identified by the GID to recognize and route transactions bearing the merchant's MID and TID; and updating the front-end processing center and the back-end settlement network to recognize and process transactions bearing the selected MID and TID.

* * * * *